(12) United States Patent
Roy et al.

(10) Patent No.: US 10,673,476 B2
(45) Date of Patent: Jun. 2, 2020

(54) RECEIVER HAVING EQUALIZATION WITH ITERATIVE PARALLEL PROCESSING AND NOISE DE-WHITENING MITIGATION

(71) Applicant: NXP USA, Inc., Austin, TX (US)

(72) Inventors: Sayak Roy, Kolkata (IN); Salil Kashyap, Muzaffarpur (IN); Ankit Sethi, Pune (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/381,713

(22) Filed: Apr. 11, 2019

(65) Prior Publication Data

US 2019/0319657 A1    Oct. 17, 2019

Related U.S. Application Data (60) Provisional application No. 62/656,287, filed on Apr. 11, 2018.

(51) Int. Cl.
| | |
|---|---|
| *H03H 7/30* | (2006.01) |
| *H03H 7/40* | (2006.01) |
| *H03K 5/159* | (2006.01) |
| *H04B 1/12* | (2006.01) |

(52) U.S. Cl.
CPC ................... *H04B 1/123* (2013.01)

(58) Field of Classification Search
CPC .... H04B 1/123; H04L 25/0328; H04L 43/022
USPC ................ 375/233, 232, 346, 348, 229, 230
See application file for complete search history.

(56) References Cited

U.S. PATENT DOCUMENTS

| | | | |
|---|---|---|---|
| 7,978,759 B1 | 7/2011 | Sarrigeorgidis | |
| 2006/0227903 A1 | 10/2006 | Niu et al. | |
| 2011/0051611 A1* | 3/2011 | Chung | H04L 43/022 370/252 |
| 2012/0263222 A1* | 10/2012 | Wang | H04L 25/0328 375/232 |

OTHER PUBLICATIONS

International Search Report and Written Opinion in PCT/US2019/027000 dated Jul. 3, 2019.

(Continued)

*Primary Examiner* — Phuong Phu (57) ABSTRACT

This disclosure describes a receiver having equalization with noise de-whitening mitigation for wireless communication. An input port receives, via an antenna, a signal communicated over a wireless communication link, the signal comprising a noise component. Control circuitry performs zero forcing equalization of the received signal to generate a zero forcing equalization result signal. The zero forcing equalization causes de-whitening of the noise component by increasing a correlation among elements of the noise component. The control circuitry mitigates the de-whitening of the noise component by: determining a noise variance value based on channel properties of the wireless communication link, and modifying the zero forcing equalization result signal based on the noise variance value. The modified zero forcing equalization result signal is communicated, via an output port, to log-likelihood ratio (LLR) generation circuitry for LLR computation.

18 Claims, 5 Drawing Sheets

(56) References Cited

OTHER PUBLICATIONS

Kim et al., "An Energy-Efficient Multiple-Input Multiple-Output (MIMO) Detector Architecture", Signal Processing Systems (SIPS), IEEE, Oct. 4, 2011, pp. 239-244.
Ma et al., "Reduced-Complexity MSGR-Based Matrix Inversion", Signal Processing Systems, IEEE, Oct. 8, 2008, pp. 124-128.
Sungho et al., "Multiple-Input Multiple-Output Cloud Transmission for High Data Rate Local Contents Delivery", IEEE International Symposium on Broadband Multimedia Systems and Broadcasting, Jun. 25, 2014, 5 pgs.

* cited by examiner

RECEIVER HAVING EQUALIZATION WITH ITERATIVE PARALLEL PROCESSING AND NOISE DE-WHITENING MITIGATION

CROSS-REFERENCE TO RELATED APPLICATION

This disclosure claims the benefit under 35 U.S.C. § 119(e) of commonly-assigned U.S. Provisional Patent Application No. 62/656,287, filed on Apr. 11, 2018, which is hereby incorporated by reference herein in its entirety.

FIELD OF USE

This disclosure relates to zero forcing equalization for Wi-Fi systems on chips (SoCs) and, specifically, to a receiver having a zero forcing equalizer that (1) utilizes an iterative and parallel computation algorithm that decreases chip real estate requirements and latency in the zero forcing equalization of a wirelessly received signal (e.g., a multi-stream symbol), and (2) utilizes noise variance-based values as scaling factors to combat the de-whitening of noise present in the received signal, thereby facilitating improved accuracy in downstream log-likelihood-ratio-based (LLR-based) signal decoding and decreased packet error rates (PER) and bit error rates (BER) in downstream signal decoding.

BACKGROUND OF THE DISCLOSURE

The background description provided herein is for the purpose of generally presenting the context of the disclosure. Work of the inventors hereof, to the extent the work is described in this background section, as well as aspects of the description that do not otherwise qualify as prior art at the time of filing, are neither expressly nor impliedly admitted to be prior art against the present disclosure.

Existing wireless communication systems often operate based on coded bits being mapped to constellation symbols, which, in turn, get mapped to multi-stream symbols. In the receive chain of receiver devices in such communication systems, after a received multi-stream symbol has been downconverted to a baseband frequency range and digitized, zero forcing equalizer circuitry typically performs zero forcing equalization on the baseband multi-stream symbol. The output of the zero forcing equalizer is passed to a log-likelihood ratio (LLR) computation block, which computes LLRs for each bit present in the zero force equalized symbol. Each LLR indicates an a measure of confidence that a particular bit was transmitted as a binary one or a binary zero. The LLRs are passed to a decoding block, which decodes the bits of the symbol. Conventional zero forcing equalizers, however, are inefficient in that they require many repetitive sequential computations to invert matrices for zero forcing equalization. Such required sequential computations increase the latency in performing zero forcing equalization upon received symbols and significant chip real estate is required to perform such computations. Additionally, conventional zero forcing equalizers de-whiten elements of a complex-valued noise vector present in received symbols. De-whitening causes the noise elements to have different noise variance values from one another and to become correlated with one another. Such de-whitening of noise vectors degrades the performance of downstream LLR computation by increasing the instances of inaccurate bit value predictions. Such inaccurate bit value predictions increase the bit error rate (BER) and/or packet error rate (PER), and thus decrease the throughput, of conventional wireless receiver systems.

SUMMARY

Embodiments described herein provide a receiver having equalization for a wireless communication system. In one aspect, a receiver having equalization with noise de-whitening mitigation comprises an input port, control circuitry, and an output port. The input port is configured to receive, via an antenna, a signal communicated over a wireless communication link. The signal comprises a noise component. The control circuitry is configured to perform zero forcing equalization of the received signal to generate a zero forcing equalization result signal. The zero forcing equalization causes de-whitening of the noise component by increasing a correlation among elements of the noise component. The control circuitry mitigates the de-whitening of the noise component by: determining a noise variance value based on channel properties of the wireless communication link, and modifying the zero forcing equalization result signal based on the noise variance value. The output port is configured to communicate the modified zero forcing equalization result signal to log-likelihood ratio (LLR) generation circuitry for LLR computation.

In another aspect, the control circuitry is configured to perform zero forcing equalization of components of the received signal in an iterative manner by reusing results of prior computations for other components of the received signal.

In a further aspect, the received signal comprises a plurality of transmitted data streams and the control circuitry is further configured to concurrently perform, in parallel, zero forcing equalization upon each of the transmitted data streams.

In yet another aspect, the control circuitry is further configured to: decompose a channel matrix, which describes the channel properties for the wireless communication link, to determine a constituent component of the channel matrix (e.g., an R component determined from QR decomposition); perform scaling of the constituent component of the channel matrix; and compute a diagonalizer (which may sometimes be loosely referred to as inverse) of the constituent component based on the scaled constituent component, wherein the generation of the zero forcing equalization result signal is based at least in part on the diagonalizer of the constituent component.

In one aspect, the constituent component is a matrix and the control circuitry is further configured to compute each column of the diagonalizer of the constituent component matrix by setting a value of each entry of the column, that has a row index greater than a row index of a diagonal entry of the column, equal to zero.

In another aspect, the scaled component is a scaled matrix and each entry of the scaled matrix has a row index and a column index. The control circuitry is further configured to generate the scaled matrix by: setting a value of each diagonal entry of the scaled matrix equal to one; setting to zero a value of each entry of the scaled matrix for which the row index is greater than the column index; and determining a value of each entry of the scaled matrix for which the row index is less than the column index, by scaling an entry of the constituent component, that has the row index and the column index, by an inverse of a diagonal entry of the constituent component having the column index.

In a further aspect, the control circuitry is further configured to compute a gain value for each of one or more wirelessly transmitted data streams based on the noise variance value and output the gain value via the output port.

In yet another aspect, the control circuitry is further configured to: decompose a channel matrix, which describes the channel properties for the wireless communication link, to determine a constituent component of the channel matrix; generate, based on the received signal and the constituent component, an intermediate signal value having a noise vector, wherein the zero forcing equalization result signal is generated based at least in part on the intermediate signal value; and mitigating de-whitening of elements of the noise vector based on the noise variance value.

In one aspect, the received signal comprises a total number of wirelessly transmitted data streams and the control circuitry is further configured to generate the intermediate signal value by extracting, from a value derived from the constituent component and the received signal, a number of rows equal to the total number of wirelessly transmitted data streams.

In another aspect, the control circuitry is further configured to modify the zero forcing equalization result signal by dividing the zero forcing equalization result signal by a square root of the noise variance value.

Embodiments described herein also provide a method for receiving a signal in a wireless communication device. In one aspect, the method comprises receiving, at an input port via an antenna, a signal communicated over a wireless communication link. The signal comprises a noise component. Zero forcing equalization of the received signal is performed to generate a zero forcing equalization result signal. The zero forcing equalization causes de-whitening of the noise component by increasing a correlation among elements of the noise component. The de-whitening of the noise component is mitigated by: determining a noise variance value based on channel properties of the wireless communication link, and modifying the zero forcing equalization result signal based on the noise variance value. The modified zero forcing equalization result signal is communicated, via an output port, to log-likelihood ratio (LLR) generation circuitry for LLR computation.

In yet another aspect, zero forcing equalization of components of the received signal is performed in an iterative manner by reusing results of prior computations for other components of the received signal.

In one aspect, the received signal comprises a plurality of transmitted data streams and the method further comprises concurrently performing, in parallel, zero forcing equalization upon each of the transmitted data streams.

In another aspect, the method further comprises: decomposing a channel matrix, which describes the channel properties for the wireless communication link, to determine a constituent component of the channel matrix. The constituent component of the channel matrix is scaled, and a diagonalizer of the constituent component is computed based on the scaled constituent component. The zero forcing equalization result signal is generated based at least in part on the diagonalizer of the constituent component.

In a further aspect, the constituent component is a matrix and the method further comprises computing each column of the diagonalizer of the constituent component matrix by setting a value of each entry of the column, that has a row index greater than a row index of a diagonal entry of the column, equal to zero.

In yet another aspect, the scaled component is a scaled matrix and each entry of the scaled matrix has a row index and a column index. The generating of the scaled matrix comprises: setting a value of each diagonal entry of the scaled matrix equal to one; setting to zero a value of each entry of the scaled matrix for which the row index is greater than the column index; and determining a value of each entry of the scaled matrix for which the row index is less than the column index, by scaling an entry of the constituent component, that has the row index and the column index, by an inverse of a diagonal entry of the constituent component having the column index.

In one aspect, the method further comprises computing a gain value for each of one or more wirelessly transmitted data streams based on the noise variance value; and outputting the gain value via the output port.

In another aspect, the method further comprises decomposing a channel matrix, which describes the channel properties for the wireless communication link, to determine a constituent component of the channel matrix. Based on the received signal and the constituent component, an intermediate signal value having a noise vector is generated. The zero forcing equalization result signal is generated based at least in part on the intermediate signal value. The de-whitening of elements of the noise vector is mitigated based on the noise variance value.

In a further aspect, the received signal comprises a total number of wirelessly transmitted data streams and generating the intermediate signal value comprises extracting from a value derived from the constituent component, a number of rows equal to the total number of wirelessly transmitted data streams.

In yet another aspect, modifying the zero forcing equalization result signal comprises dividing the zero forcing equalization result signal by a square root of the noise variance value.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

In view of the inefficiency of conventional zero forcing equalization in wireless receiver systems, in accordance with implementations described herein a receiver having a zero forcing equalizer with iterative parallel processing and mitigation of noise de-whitening is provided. Iterative parallel processing improves the speed (or decreases the latency) at which zero forcing equalization is performed. Mitigation of noise de-whitening minimizes or avoids the degradation, which results from the noise de-whitening characteristic of conventional zero forcing equalizers, in the accuracy of bit value estimation performed by downstream LLR computation circuitry. Mitigation of noise de-whitening improves the quality of the signal from which bits are extracted so that a signal of improved fidelity is available for subsequent operations. This differs from, and requires less processing time than, previous techniques which rely upon forward error correction to correct bit errors, including bit errors resulting from de-whitening.

Specifically, embodiments described herein provide a receiver having a zero forcing equalizer that improves processing efficiency by computing values of certain matrix entries based solely upon their respective row and column positions, and by executing iterative processing to compute values of certain other matrix entries by reusing results of prior computations (e.g., for matrix diagonalization) instead of repeating computations for each entry of a matrix as performed by conventional zero forcing equalizers.

Additionally, by taking advantage of the independence of matrix columns, the zero forcing equalization algorithm of the embodiments described herein is configured to perform matrix diagonalization on a column-by-column basis, thereby enabling matrix diagonalization to be performed in parallel for each column of a matrix. By computing values of certain matrix entries based solely upon their row and column positions, reusing results of prior computations for other matrix entries, and utilizing parallel processing to perform matrix diagonalization, the zero forcing equalizer of embodiments described herein significantly increase the speed at which zero forcing equalization may be completed. The benefits of such a speed increase are compounded when employed in as advanced wireless receivers, for example Wi-Fi 6-compliant systems, which utilize multiple antennas and corresponding multiple receiver channels in each device.

Further, embodiments described herein compute noise variance values on a per-stream basis based on a respective row of a matrix that is derived from a channel matrix, and use those noise variance values as the basis to scale the outputs (e.g., matrix values and gain values) of the zero forcing equalizer before downstream LLR computation. Scaling based on noise variance in this manner helps bring noise variance values to unity for every bit present in a received multi-stream symbol, which, in turn, combats the de-whitening of noise that is characteristic of conventional wireless receiver systems. Scaling based on noise variance decreases the instances of inaccurate bit value estimations in downstream LLR computation and thereby significantly decreases the bit error rates (BER) and/or packet error rates (PER) relative to the BER and/or PER exhibited in conventional wireless receiver systems.

In general, a white noise signal (or vector) is a noise signal consisting of elements that are uncorrelated with one another and that have the same noise variance value. As used herein, "de-whitening" a white noise signal (or vector) means modifying the white noise signal to cause at least some of its elements not to have the same noise variance value and/or to introduce correlation between at least some of its elements. As used herein, "mitigating de-whitening" of a signal (or vector) means modifying the signal to cause at least some of its elements to have the same noise variance value and/or to reduce or eliminate correlation between at least some of its elements.

Figure 1:
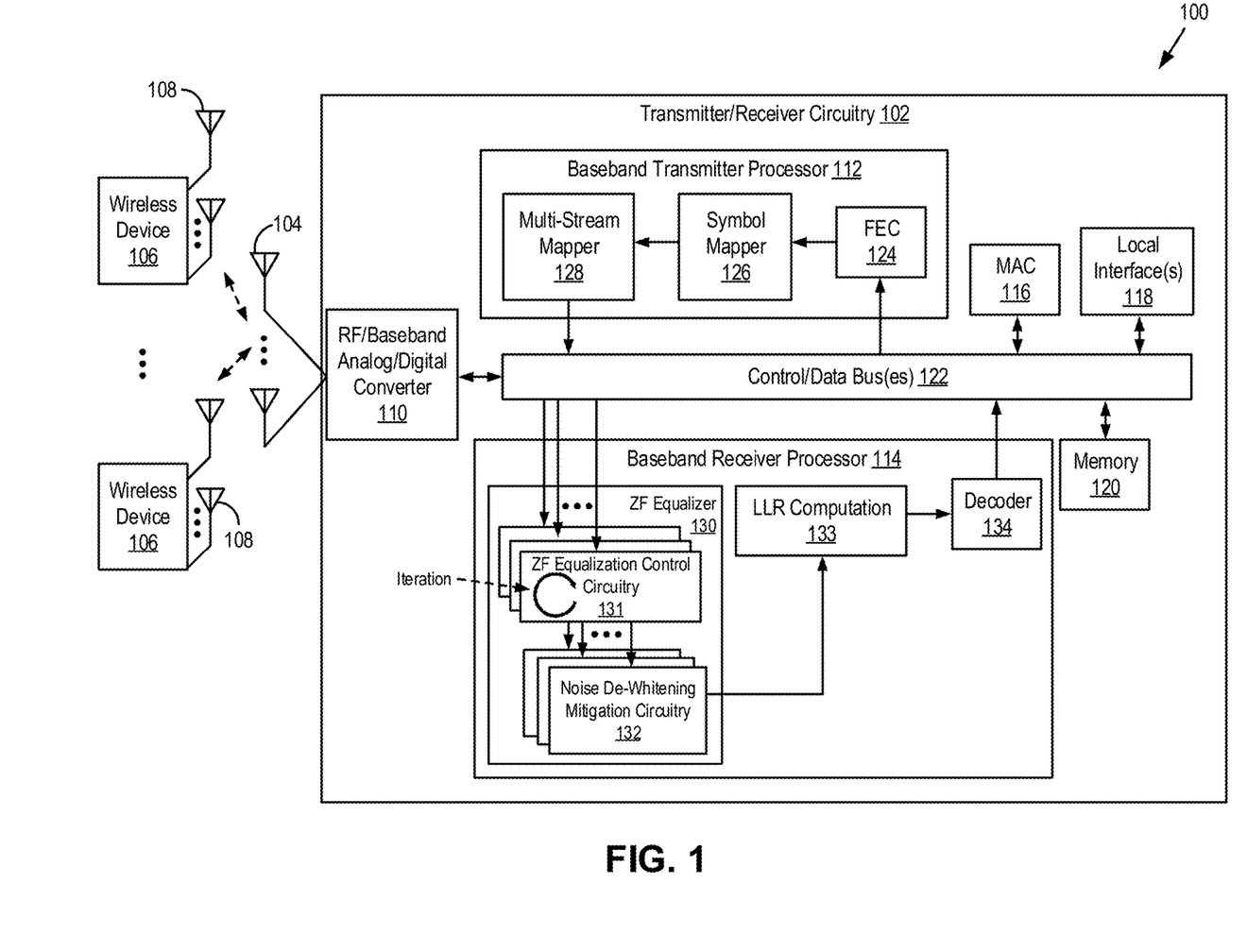
FIG. 1 is a schematic representation of a wireless communication system including a receiver having a zero forcing equalizer with iterative parallel processing and noise de-whitening in accordance with some embodiments of the subject matter of this disclosure.

FIG. 1 is a schematic illustration of a wireless communication system 100 including a transmitter/receiver having zero forcing equalizer 130 with iterative parallel processing and noise de-whitening in accordance with some embodiments of the subject matter of this disclosure. System 100 includes transmitter/receiver circuitry 102, coupled to one or more transmitting/receiving antennas 104, and one or more wireless devices 106 having one or more antennas 108. Transmitter/receiver circuitry 102 is generally configured to transmit wireless signals to the one or more wireless devices 106 via communication paths including antennas 104 and 108, and to receive wireless signals from the one or more wireless devices 106 via communication paths including antennas 108 and 104. In some aspects system 100 is implemented as a system-on-chip (SoC) that is compliant with the Wi-Fi 6 wireless communication standard, which is also referred to as the IEEE 802.11ax wireless communication standard. In this regard, transmitter/receiver circuitry 102, in some aspects, utilize the multiple antennas 104 for spatial stream signal transmission and reception to facilitate full multi-user multiple-input and multiple-output (MU-MIMO) and orthogonal frequency-division multiple access (OFDMA) uplink and downlink capability.

Transmitter/receiver circuitry 102 includes RF/baseband analog/digital converter 110, baseband transmitter processor circuitry 112, baseband receiver processor circuitry 114, media access control (MAC) circuitry 116, local interface(s) 118, and memory 120, which are communicatively coupled to one another via control/data bus(es) 122. Although certain components of transmitter/receiver circuitry 102 are depicted as separate components in FIG. 1, in other aspects, various components in transmitter/receiver circuitry 102 may be integrated into a single component. For instance, baseband transmitter processor circuitry 112 and baseband receiver processor circuitry 114 may be implemented as a single processor.

RF/baseband analog/digital converter 110 serves as an RF front end for transmitter/receiver circuitry 102, performing functions such as filtering, amplification, downconversion of received RF signals into baseband signals for processing, upconversion of baseband signals to RF signals for wireless transmission, digitization of analog signals, and the like. Memory 120 is used for buffering transmitted and received data, storing instructions for execution by one or more of the other components of transmitter receiver circuitry 102, such as baseband transmitter processor circuitry 112, baseband receiver processor circuitry 114, and/or the like. MAC 116 provides flow control and/or multiplexing for the transmission medium (e.g., including antennas 104), in an implementation. Local interface(s) 118 may be any type of local interface, such as a 2-wire serial interface, a serial peripheral interface (SPI), a general-purpose input/output (GPIO) interface, a peripheral component interconnect express (PCIe) 3.0 interface, a modular chip interconnect, and/or the like. The one or more local interfaces 118 enable transmitter/receiver circuitry 102 to communicate control and/or data (e.g., wirelessly received data and/or data to be wirelessly transmitted) with circuitry external to transmitter/receiver circuitry 102.

In one example, transmitter/receiver circuitry 102 facilitates wireless communication based on coded bits being mapped to constellation symbols which in turn get mapped to multi-stream symbols. In such an example, on the transmitting side, baseband transmitter processor circuitry 112 includes forward error correction (FEC) circuitry 124, which performs forward error correction encoding upon data to be transmitted, symbol mapper 126, which maps coded bits to constellation symbols according to a modulation scheme such as quadrature amplitude modulation (QAM) or the like, and multi-stream mapper 128, which maps the constellation symbols to multi-stream symbols to be wirelessly transmitted via antennas 104, respectively.

In multi-stream communication, if x is the multi-stream transmitted symbol, then the received baseband multi-stream symbol y can be written according to equation (1) below, where $N_r$ represents the number of receive antennas, $N_{ss}$ represents the number of spatial streams, y is a complex-valued received vector of dimension $N_r \times 1$, H is a complex-valued $N_r \times N_{ss}$ channel seen by baseband receiver processor circuitry 114, with its $(i,j)^{th}$ element representing the channel gain for $j^{th}$ stream seen on $i^{th}$ receiving antenna 104, w is complex valued noise-vector of dimension $N_r \times 1$, and x is a $N_{ss} \times 1$ complex-valued vector transmitted by one of wireless device(s) 108.

$$y = Hx + w \quad (1)$$

On the receiving side, baseband receiver processor circuitry 114 includes zero forcing equalizer (ZFE) 130, which performs zero forcing equalization on baseband signal vectors derived from signals wirelessly received from wireless device(s) 108 via communication paths including antennas 108 and 104. In general, zero forcing equalization may be used, for example, to bring down intersymbol interference and/or to recover multiple spatial streams. Below is a brief description of the features and functionality of ZFE 130. In some implementations, ZFE 130 includes multiple instances of ZFE control circuitry 131 and/or noise de-whitening mitigation circuitry 132, to facilitate iterative parallel processing and noise de-whitening, as illustrated in the figures and as described elsewhere herein. Additional details regarding the features and functionality of ZFE 130 are provided below in connection with FIGS. 2 through 5.

ZFE 130 receives baseband multi-stream symbol (or vector) y at its input port and using ZFE control circuitry 131 and noise de-whitening mitigation circuitry 132, generates an $N_{ss} \times 1$ output vector y" (which represents a result of zero forcing equalization being applied to received baseband multi-stream symbol y) and gain values $g_i$, for $1 \le i \le N_{ss}$ (which represent respective gains for the $i^{th}$ received symbols). ZFE 130 communicates, via its output port, output vector y" and gain values $g_i$, for $1 \le i \le N_{ss}$, downstream to log-likelihood ratio (LLR) computation circuitry 133. LLR computation circuitry 133 uses output vector y" and gain values $g_i$ to compute log-likelihood ratios for each bit present in the received multi-stream symbol output vector y". In one example, LLR computation circuitry 133 scales up a constellation that was used during transmission of the multi-stream transmitted symbol x by $g_i^2$, and then computes the LLR for each bit of multi-stream symbol output vector y" by taking the difference of its square distance from the nearest scaled up constellation symbol for which the bit is 1 and nearest scaled up constellation symbol for which this bit is 0. The output of LLR computation circuitry 133 for a given bit, in some aspects, may take the form of a ratio of a logarithm of the probability of the bit being a binary zero to logarithm of the probability of the bit being a binary one. LLR computation circuitry 133 passes LLRs for each bit of the received multi-stream symbol output vector y" to decoder 134, which decodes the bits into their unencoded form for downstream processing, transmission, storage, or other use.

Figure 2:
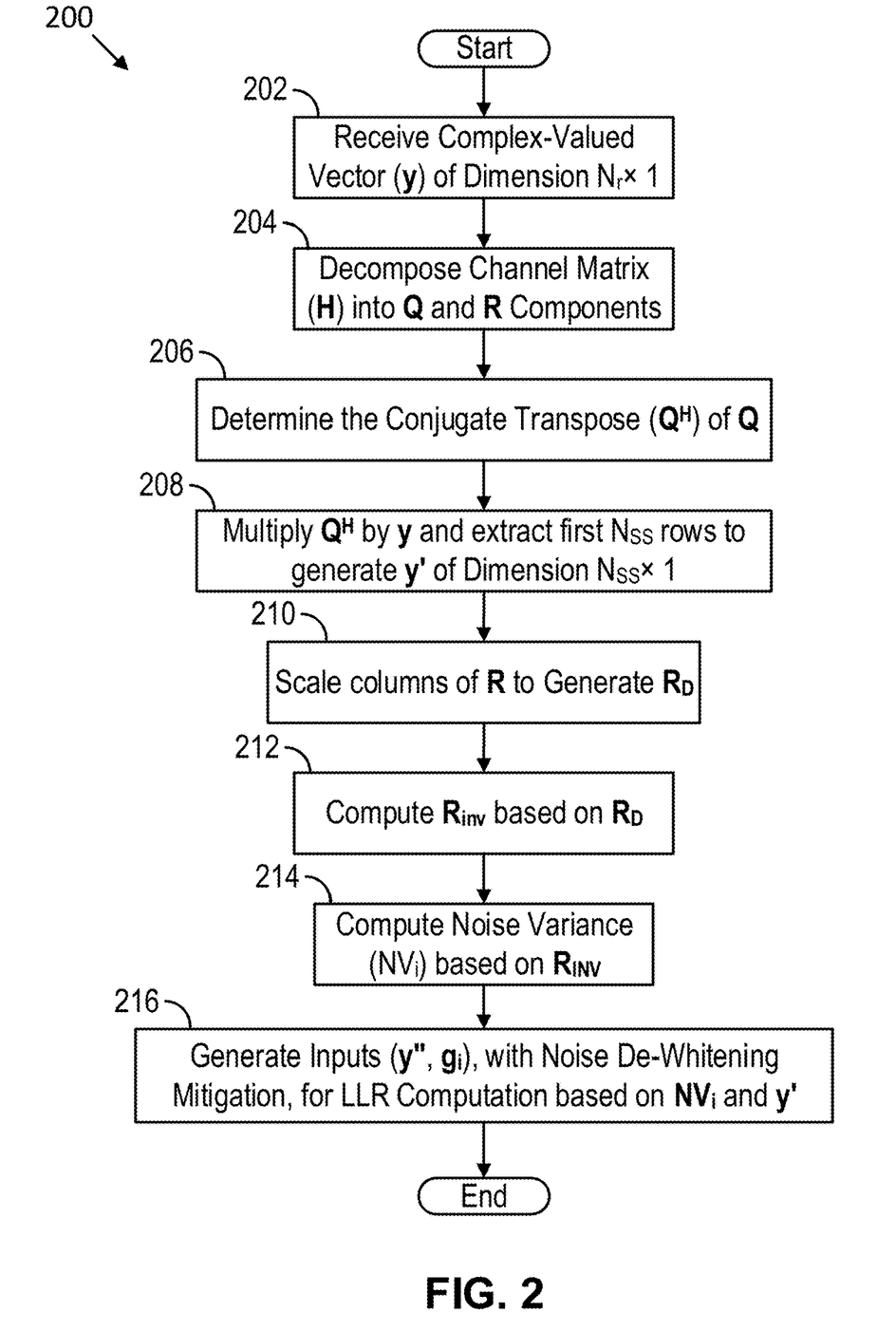
FIG. 2 is a flow diagram of a method for utilizing the receiver of FIG. 1 to perform zero force equalization of a received signal, in accordance with embodiments of the subject matter of this disclosure.

Having described wireless communication system 100, reference is now made to FIG. 2, which is a flow diagram of a method 200 for utilizing the ZFE 130 of system 100 to perform zero force equalization of a received signal, in accordance with embodiments of the subject matter of this disclosure. At 202, ZFE 130 receives, from RF/Baseband Analog/Digital Converter 110 over bus 122, a baseband multi-stream symbol, which is a complex-valued vector y of dimension $N_r \times 1$, that was received by wireless device(s) 108 via one of antennas 104.

Channel properties of the wireless link or path that includes the antenna 104 that received the vector y are described in a channel matrix H. The channel matrix H may be determined in any number of ways, such as by using channel estimation techniques. At 204, ZFE control circuitry 131 performs QR decomposition upon the channel matrix H to determine its Q component and its R component (sometimes referred to herein as Q matrix and R matrix, respectively), with the Q component being orthonormal and the R component being an $N_{ss} \times N_{ss}$ upper triangular matrix.

At 206, ZFE control circuitry 131 determines the conjugate transpose ($Q^H$) of the Q component that was determined at 204 for channel matrix H. At 208, ZFE control circuitry 131 multiplies the conjugate transpose ($Q^H$) determined at 206 by the vector y received at 202 and extracts the first $N_{ss}$ rows of the resulting product to generate intermediate vector y' of dimension $N_{ss} \times 1$. Intermediate vector y' is governed by equation (2) below, where y' represents a complex-valued vector of dimension $N_{ss} \times 1$, component R represents the $N_{ss} \times N_{ss}$ upper triangular matrix obtained from QR decomposition of channel matrix H at 204, and w' represents an $N_{ss} \times 1$ complex-valued noise vector which is also governed by equation (3) below.

$$y' = R \cdot x + w' \quad (2)$$

$$w' = Q^H w \quad (3)$$

As an example, if $N_{ss} = 8$, then the R component of channel matrix H assumes the structure shown in equation (4) below, with real values denoted by lowercase letters and complex values denoted by capital letters.

$$R = \begin{bmatrix} r_{11} & R_{12} & R_{13} & R_{14} & R_{15} & R_{16} & R_{17} & R_{18} \\ 0 & r_{22} & R_{23} & R_{24} & R_{25} & R_{26} & R_{27} & R_{28} \\ 0 & 0 & r_{33} & R_{34} & R_{35} & R_{36} & R_{37} & R_{38} \\ 0 & 0 & 0 & r_{44} & R_{45} & R_{46} & R_{47} & R_{48} \\ 0 & 0 & 0 & 0 & r_{55} & R_{56} & R_{57} & R_{58} \\ 0 & 0 & 0 & 0 & 0 & r_{66} & R_{67} & R_{68} \\ 0 & 0 & 0 & 0 & 0 & 0 & r_{77} & R_{78} \\ 0 & 0 & 0 & 0 & 0 & 0 & 0 & r_{88} \end{bmatrix} \quad (4)$$

At 210, ZFE control circuitry 131 scales the R component determined at 204 to generate matrix $R_D$, and at 212, ZFE control circuitry 131 computes a matrix $R_{inv}$ that diagonalizes the matrix R using matrix $R_D$ generated at 210. Details regarding an example method for scaling the R component at 210 are provided below in the context of FIG. 3, and additional details regarding an example method for using matrix $R_D$ to generate matrix $R_{inv}$ at 212 are provided below in the context of FIG. 4. In general, as described below, scaling the R component to generate matrix $R_D$ in the manner described herein in connection with 210 renders the columns of $R_D$ independent from one another and enables ZFE control circuitry 131 to perform parallel processing and it further enables implementation of an iterative algorithm that significantly increases the rate at which ZFE control circuitry 131 performs zero forcing equalization.

At 214, ZFE control circuitry 131 computes noise variance values ($NV_i$) for each stream i (for $1 \le i \le N_{ss}$) based on the matrix $R_{INV}$ generated at 212. In particular, the noise variance $NV_i$ for the $i^{th}$ stream is computed based on equation (5) below.

$$NV_i = \sum_{j=1}^{N_{ss}} |R_{inv(i,j)}|^2 \qquad (5)$$

At 216, based on the noise variance values ($NV_i$) computed at 214 and the intermediate vector y' generated at 208, ZFE control circuitry 131, in conjunction with noise de-whitening mitigation circuitry 132, generates $N_{ss} \times 1$ output vector y" (which represents a result of zero forcing equalization being applied to received baseband multi-stream symbol y) and gain values $g_i$, for $1 \le i \le N_{ss}$ (which represent respective gains for the $i^{th}$ received symbols), which are passed downstream as inputs to LLR computation circuitry 133. Additional details regarding an example method for generating inputs for downstream LLR processing or decoding at 216 are provided below in the context of FIG. 5.

Figure 3:
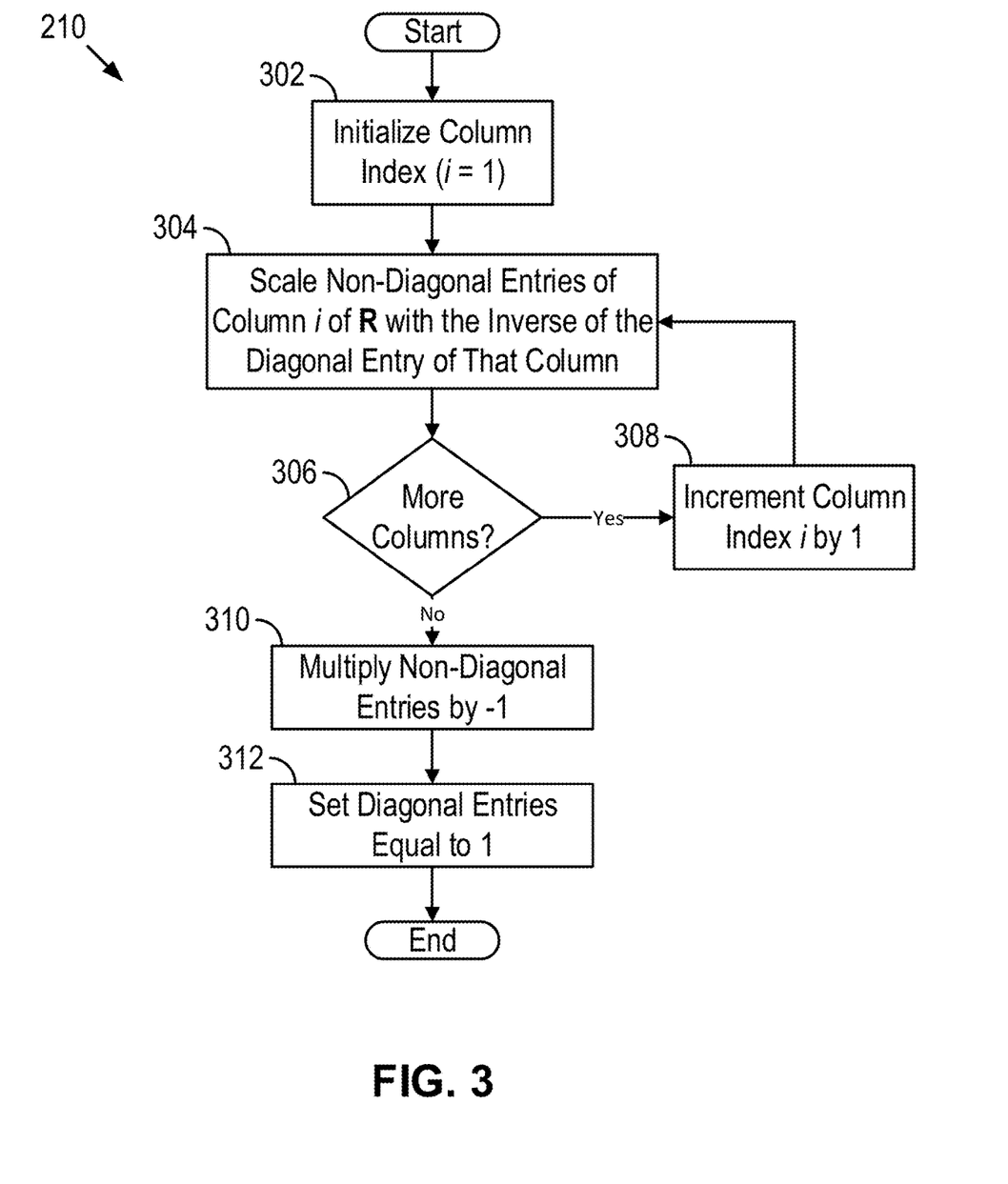
FIG. 3 is a flow diagram of a method for matrix scaling as part of the method of FIG. 2, in accordance with embodiments of the subject matter of this disclosure.

FIG. 3 is a flow diagram showing additional details of an example method 210 for performing matrix scaling as part of the method 200 of FIG. 2, in accordance with embodiments of the subject matter of this disclosure. At 302, ZFE control circuitry 131 initializes a column index i to a value of one. At 304, ZFE control circuitry 131 scales non-zero non-diagonal entries of column i of matrix R with the inverse of the diagonal entry of that column. At 306, ZFE control circuitry 131 determines whether matrix R includes any additional column that requires matrix scaling. At 308, if matrix R includes an additional column that requires matrix scaling ("Yes" at 306), ZFE control circuitry 131 increments the column index i by 1 and repeats the method of 304 to scale the non-diagonal entries of that column of matrix R in the manner described above. At 310, if matrix R includes no additional column that requires matrix scaling ("No" at 306), ZFE control circuitry 131 multiplies the non-diagonal entries of matrix R as modified at 304 by −1. At 312, ZFE control circuitry 131 sets the diagonal entries of matrix R as modified at 304 and 310 equal to 1. After the steps of method 210 are executed as described above, generation of matrix $R_D$, which is a square upper triangular matrix of dimension $N_{ss} \times N_{ss}$, is complete. The values of the $(k,i)^{th}$ entries of $R_D$, which are denoted by $\alpha_{ki}$, as computed via method 210, are given by equation (6) below.

$$\alpha_{ki} = \begin{cases} 1 & k = i \\ 0 & k > i \\ -R_{ki}/r_{ii} & k < i \end{cases} \qquad (6)$$

Figure 4:
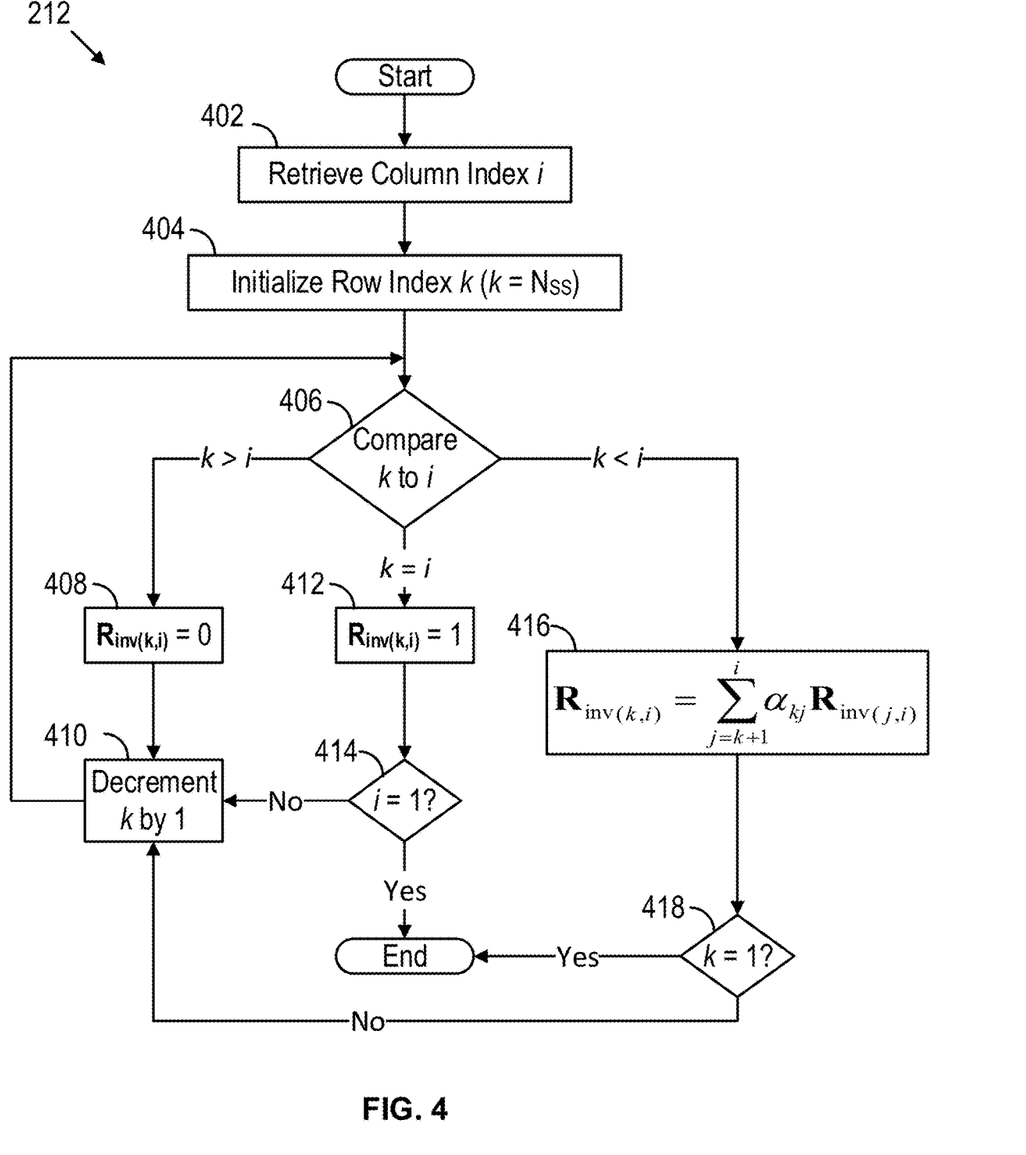
FIG. 4 is a flow diagram of a method for matrix diagonalization as part of the method of FIG. 2, in accordance with embodiments of the subject matter of this disclosure.

FIG. 4 is a flow diagram showing additional details of an example method 212 for determining based on $R_D$ a matrix $R_{inv}$ that diagonalizes matrix R, as part of the method 200 of FIG. 2, in accordance with embodiments of the subject matter of this disclosure. In various embodiments, the computation of each column of $R_{inv}$ is independent. Put differently, computation of elements of each column of $R_{inv}$ does not depend on the elements of any other column of $R_{inv}$. Performing computations in parallel for each column of matrix $R_{inv}$, for instance by implementing separate parallel circuitry (e.g., multiple instances of ZFE control circuitry 131) for each column, processing speed and throughput of ZFE 130 are significantly increased over conventional zero forcing equalizers.

At 402, a column index i for the column being processed (e.g., by retrieving a column index i from memory 120), is determined, and at 404 ZFE control circuitry 131 initializes a row index k to equal $N_{ss}$.

At 406, ZFE control circuitry 131 compares the row index k to the column index i. If the row index k is greater than the column index i ("k>i" at 406), then at 408 ZFE control circuitry 131 sets the $(k,i)^{th}$ value of matrix $R_{inv}$ ($R_{inv(k,i)}$) equal to zero. At 410, ZFE control circuitry 131 decrements the row index k by 1 and passes control back to 406 to compare the decremented row index with the column index i in the manner described above.

If the row index k is equal to the column index i ("k=i" at 406), then at 412 ZFE control circuitry 131 sets the $(k,i)^{th}$ value of matrix $R_{inv}$ ($R_{inv(k,i)}$), which is a diagonal entry of matrix $R_{inv}$, equal to one. At 414, ZFE control circuitry 131 determines whether the column index i equals 1, which would indicate that row index k also equals 1 and thus that processing of the corresponding column of matrix $R_{inv}$ is completed. If the column index i equals 1 ("Yes" at 414), then processing of column i of matrix $R_{inv}$ is complete and method 212 terminates. If the column index i does not equal 1 ("No" at 414), then at 410 ZFE control circuitry 131 decrements the row index k by 1 and compares the newly decremented row index with the column index i in the manner described above.

If the row index k is less than the column index i ("k<i" at 406), then at 416 ZFE control circuitry 131 determines the $(k,i)^{th}$ entry of $R_{inv}$ by using an iterative algorithm given by equation (7) below, with $\alpha_{ki}$ represents the $(k,i)^{th}$ entries of $R_D$ as computed via method 210.

$$R_{inv(k,i)} = \sum_{j=k+1}^{i} \alpha_{kj} R_{inv(j,i)} \qquad (7)$$

As illustrated by equation (7), the $(k,i)^{th}$ element of matrix $R_{inv}$ is computed by reusing elements $R_{inv(k',i)}$, for $k<k' \le i$, that were previously computed during prior iterations of 416 for other rows of column i. Reusing previously computed elements of $R_{inv}$ in this manner significantly reduces the complexity in computing $R_{inv}$ and reduces the processing latency of ZFE control circuitry 131.

At 418, ZFE control circuitry 131 determines whether the row index k is equal to 1, which would indicate that processing of column i of matrix $R_{inv}$ is completed. If the row index k equals 1 ("Yes" at 418), then processing of column i of matrix $R_{inv}$ is complete and method 212 terminates. If the row index k does not equal 1 ("No" at 418), then ZFE control circuitry 131 decrements the row index k by 1 at 410 and, at 406, compares the newly decremented row index with the column index i in the manner described above.

Figure 5:
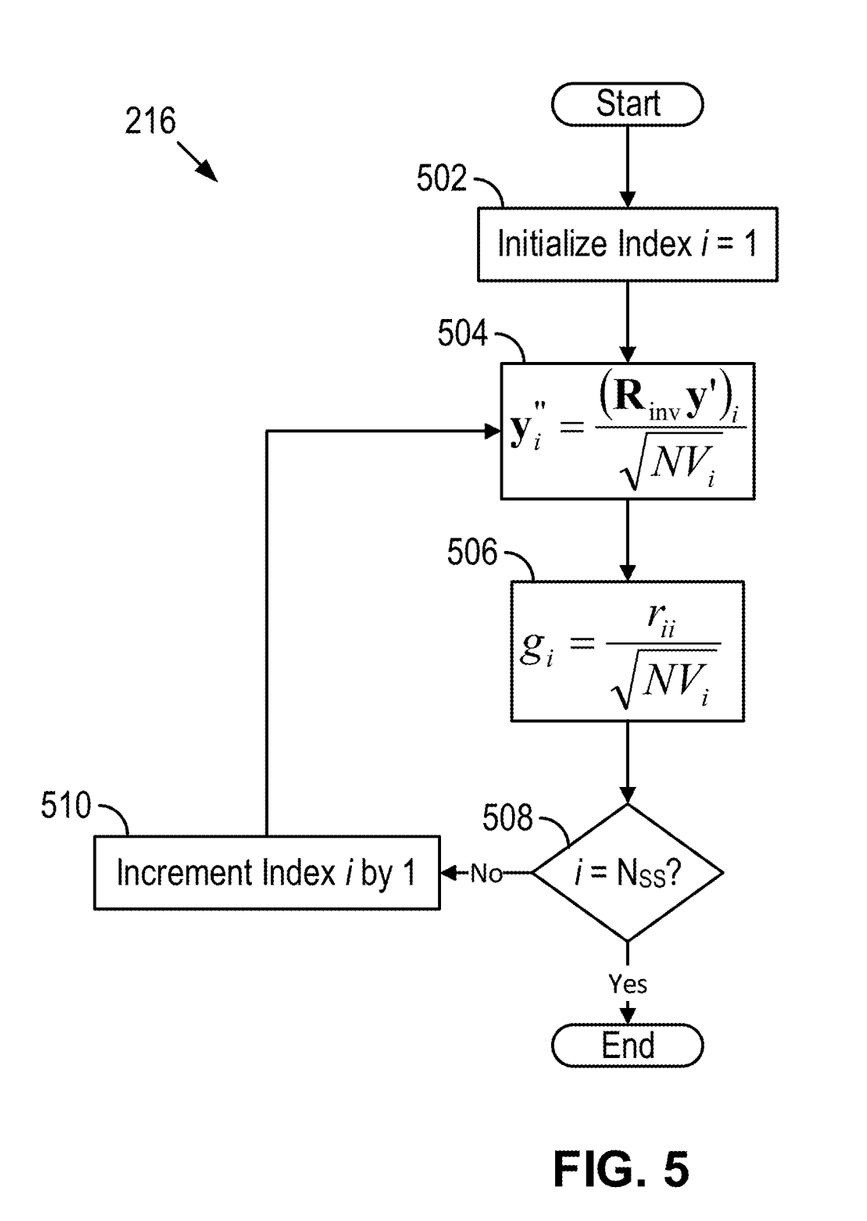
FIG. 5 is a flow diagram of a method for generating inputs for downstream log-likelihood ratio decoding as part of the method of FIG. 2, in accordance with embodiments of the subject matter of this disclosure.

FIG. 5 is a flow diagram showing additional details of an example method 216 for generating the $N_{ss} \times 1$ output vector y" (which represents a result of zero forcing equalization being applied to received baseband multi-stream symbol y) and gain values $g_i$, for $1 \le i \le N_{ss}$ (which represent respective gains for the $i^{th}$ received symbols), in a manner that mitigates noise de-whitening, as part of the method 200 of FIG.

2, in accordance with embodiments of the subject matter of this disclosure. The generated output vector y" and gain values $g_i$ are be passed downstream as inputs to log-likelihood ratio (LLR) computation circuitry 133 for downstream log-likelihood ratio decoding.

At 502, ZFE control circuitry 131 initializes index i to equal 1. At 504, noise de-whitening mitigation circuitry 132 computes the $i^{th}$ element of $N_{ss} \times 1$ output vector y" (denoted by $y"_i$) according to equation (8) below.

$$y''_i = \frac{(R_{inv}y')_i}{\sqrt{NV_i}} \quad (8)$$

At 506, noise de-whitening mitigation circuitry 132 computes the $i^{th}$ gain value (denoted by $g_i$) according to equation (9) below.

$$g_i = \frac{r_{ii}}{\sqrt{NV_i}} \quad (9)$$

Scaling the $i^{th}$ element of output vector ($y"_i$) and the $i^{th}$ gain value ($g_i$) based on the square root of the $i^{th}$ noise variance value computed at 214, helps bring the noise variance to unity for every bit present in the equalized received multi-stream symbol y". This combats or mitigates de-whitening of noise (e.g., noise vector w' described above in connection with equation (2)) and thereby significantly improves the performance of LLR computation (e.g., improves the accuracy of LLR estimates of bit values) by LLR computation circuitry 133. Improved LLR computation performance yields improved LLR estimates, which facilitates improvement of (e.g., a decrease in) the bit error rate (BER) and/or packet error rate (PER) performance of decoder 134.

At 508, noise de-whitening mitigation circuitry 132 determines whether the index i is equal to $N_{ss}$, which would indicate that generation of $N_{ss} \times 1$ output vector y" and the corresponding gain values $g_i$ (for $1 \leq i \leq N_{ss}$) is complete. If the index i is equal to $N_{ss}$ ("Yes" at 508), then zero forcing equalization of received baseband multi-stream vector y is complete and method 216 terminates. If the index i is not equal to $N_{ss}$ ("No" at 508), then at 510 noise de-whitening mitigation circuitry 132 increments the index i by 1 and repeats the methods of 504 through 508 to generate the next $i^{th}$ instance of y" and gain value g in the manner described above.

Various embodiments discussed in conjunction with FIGS. 1-5 are performed by control circuitry or various electronic components of one or more electronic circuits, such as but not limited to an integrated circuit, application-specific integrated circuit (ASIC), Field Programmable Gate Array (FPGA), digital signal processors, and/or other like circuitry. In addition, or alternatively, various embodiments and components disclosed herein are configured to be at least partially operated and/or implemented by processor-executable instructions, for example firmware instructions, that are stored on one or more transitory or non-transitory processor-readable media in memory 120.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein are employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

Other variations are within the scope of the following claims.

What is claimed is:

1. A receiver having equalization with noise de-whitening mitigation for wireless communication, comprising:
  an input port configured to receive, via an antenna, a signal communicated over a wireless communication link, the signal comprising a noise component;
  control circuitry configured to:
    perform zero forcing equalization of the received signal to generate a zero forcing equalization result signal, the zero forcing equalization causing de-whitening of the noise component by increasing a correlation among elements of the noise component; and
    mitigate the de-whitening of the noise component by:
      determining a noise variance value based on channel properties of the wireless communication link, and
      modifying the zero forcing equalization result signal based on the noise variance value; and
  an output port configured to communicate the modified zero forcing equalization result signal to log-likelihood ratio (LLR) generation circuitry for LLR computation,
  wherein the control circuitry is further configured to:
    decompose a channel matrix, which describes the channel properties for the wireless communication link, to determine a constituent component of the channel matrix;
    perform scaling of the constituent component of the channel matrix; and
    compute a diagonalizer of the constituent component based on the scaled constituent component,
    wherein the generation of the zero forcing equalization result signal is based at least in part on the diagonalizer of the constituent component.

2. The receiver of claim 1, wherein the control circuitry is configured to perform zero forcing equalization of components of the received signal in an iterative manner by reusing results of prior computations for other components of the received signal.

3. The receiver of claim 1, wherein the received signal comprises a plurality of transmitted data streams and the control circuitry is further configured to concurrently perform, in parallel, zero forcing equalization upon each of the transmitted data streams.

4. The receiver of claim 1, wherein the constituent component is a matrix and the control circuitry is further configured to compute each column of the diagonalizer of the constituent component matrix by setting a value of each entry of the column, that has a row index greater than a row index of a diagonal entry of the column, equal to zero.

5. The receiver of claim 1, wherein the scaled component is a scaled matrix, each entry of the scaled matrix has a row index and a column index, and the control circuitry is further configured to generate the scaled matrix by:
  setting a value of each diagonal entry of the scaled matrix equal to one;

setting to zero a value of each entry of the scaled matrix for which the row index is greater than the column index; and determining a value of each entry of the scaled matrix for which the row index is less than the column index, by scaling an entry of the constituent component, that has the row index and the column index, by an inverse of a diagonal entry of the constituent component having the column index.

6. A receiver having equalization with noise de-whitening mitigation for wireless communication, comprising:
an input port configured to receive, via an antenna, a signal communicated over a wireless communication link, the signal comprising a noise component;
control circuitry configured to:
perform zero forcing equalization of the received signal to generate a zero forcing equalization result signal, the zero forcing equalization causing de-whitening of the noise component by increasing a correlation among elements of the noise component; and
mitigate the de-whitening of the noise component by:
determining a noise variance value based on channel properties of the wireless communication link, and modifying the zero forcing equalization result signal based on the noise variance value; and
an output port configured to communicate the modified zero forcing equalization result signal to log-likelihood ratio (LLR) generation circuitry for LLR computation,
the control circuitry being further configured to compute a gain value for each of one or more wirelessly transmitted data streams based on the noise variance value and output the gain value via the output port.

7. A receiver having equalization with noise de-whitening mitigation for wireless communication, comprising:
an input port configured to receive, via an antenna, a signal communicated over a wireless communication link, the signal comprising a noise component;
control circuitry configured to:
perform zero forcing equalization of the received signal to generate a zero forcing equalization result signal, the zero forcing equalization causing de-whitening of the noise component by increasing a correlation among elements of the noise component; and
mitigate the de-whitening of the noise component by:
determining a noise variance value based on channel properties of the wireless communication link, and modifying the zero forcing equalization result signal based on the noise variance value; and
an output port configured to communicate the modified zero forcing equalization result signal to log-likelihood ratio (LLR) generation circuitry for LLR computation,
the control circuitry being further configured to:
decompose a channel matrix, which describes the channel properties for the wireless communication link, to determine a constituent component of the channel matrix;
generate, based on the received signal and the constituent component, an intermediate signal value having a noise vector,
wherein the zero forcing equalization result signal is generated based at least in part on the intermediate signal value; and
mitigate de-whitening of elements of the noise vector based on the noise variance value.

8. The receiver of claim 7, wherein the received signal comprises a total number of wirelessly transmitted data streams and the control circuitry is further configured to generate the intermediate signal value by extracting, from a value derived from the constituent component and the received signal, a number of rows equal to the total number of wirelessly transmitted data streams.

9. The receiver of claim 7, wherein the control circuitry is further configured to modify the zero forcing equalization result signal by:
dividing the zero forcing equalization result signal by a square root of the noise variance value.

10. A method for receiving a signal in a wireless communication device, the method comprising:
receiving, at an input port via an antenna, a signal communicated over a wireless communication link, the signal comprising a noise component;
performing zero forcing equalization of the received signal to generate a zero forcing equalization result signal, the zero forcing equalization causing de-whitening of the noise component by increasing a correlation among elements of the noise component;
mitigating the de-whitening of the noise component by:
determining a noise variance value based on channel properties of the wireless communication link, and modifying the zero forcing equalization result signal based on the noise variance value; and
communicating, via an output port, the modified zero forcing equalization result signal to log-likelihood ratio (LLR) generation circuitry for LLR computation, wherein the method further comprises:
decomposing a channel matrix, which describes the channel properties for the wireless communication link, to determine a constituent component of the channel matrix;
performing scaling of the constituent component of the channel matrix; and
computing a diagonalizer of the constituent component based on the scaled constituent component,
wherein the zero forcing equalization result signal is generated based at least in part on the diagonalizer of the constituent component.

11. The method of claim 10, wherein zero forcing equalization of components of the received signal is performed in an iterative manner by reusing results of prior computations for other components of the received signal.

12. The method of claim 10, wherein the received signal comprises a plurality of transmitted data streams and the method further comprises concurrently performing, in parallel, zero forcing equalization upon each of the transmitted data streams.

13. The method of claim 10, wherein the constituent component is a matrix and the method further comprises computing each column of the diagonalizer of the constituent component matrix by setting a value of each entry of the column, that has a row index greater than a row index of a diagonal entry of the column, equal to zero.

14. The method of claim 10, wherein the scaled component is a scaled matrix, each entry of the scaled matrix has a row index and a column index, and generating the scaled matrix comprises:
setting a value of each diagonal entry of the scaled matrix equal to one;
setting to zero a value of each entry of the scaled matrix for which the row index is greater than the column index; and
determining a value of each entry of the scaled matrix for which the row index is less than the column index, by scaling an entry of the constituent component, that has the row index and the column index, by an inverse of a diagonal entry of the constituent component having the column index.

15. A method for receiving a signal in a wireless communication device, the method comprising:
   receiving, at an input port via an antenna, a signal communicated over a wireless communication link, the signal comprising a noise component;
   performing zero forcing equalization of the received signal to generate a zero forcing equalization result signal, the zero forcing equalization causing de-whitening of the noise component by increasing a correlation among elements of the noise component;
   mitigating the de-whitening of the noise component by:
      determining a noise variance value based on channel properties of the wireless communication link, and
      modifying the zero forcing equalization result signal based on the noise variance value; and
   communicating, via an output port, the modified zero forcing equalization result signal to log-likelihood ratio (LLR) generation circuitry for LLR computation, wherein the method further comprises:
   computing a gain value for each of one or more wirelessly transmitted data streams based on the noise variance value; and
   outputting the gain value via the output port.

16. A method for receiving a signal in a wireless communication device, the method comprising:
   receiving, at an input port via an antenna, a signal communicated over a wireless communication link, the signal comprising a noise component;
   performing zero forcing equalization of the received signal to generate a zero forcing equalization result signal, the zero forcing equalization causing de-whitening of the noise component by increasing a correlation among elements of the noise component;
   mitigating the de-whitening of the noise component by:
      determining a noise variance value based on channel properties of the wireless communication link, and
      modifying the zero forcing equalization result signal based on the noise variance value; and
   communicating, via an output port, the modified zero forcing equalization result signal to log-likelihood ratio (LLR) generation circuitry for LLR computation, wherein the method further comprises:
      decomposing a channel matrix, which describes the channel properties for the wireless communication link, to determine a constituent component of the channel matrix;
      generating, based on the received signal and the constituent component, an intermediate signal value having a noise vector,
      wherein the zero forcing equalization result signal is generated based at least in part on the intermediate signal value, and
      mitigating de-whitening of elements of the noise vector based on the noise variance value.

17. The method of claim 16, wherein the received signal comprises a total number of wirelessly transmitted data streams and generating the intermediate signal value comprises extracting from a value derived from the constituent component, a number of rows equal to the total number of wirelessly transmitted data streams.

18. The method of claim 16, wherein modifying the zero forcing equalization result signal comprises:
   dividing the zero forcing equalization result signal by a square root of the noise variance value.

* * * * *